(12) United States Patent
Chen et al.

(10) Patent No.: US 6,993,522 B2
(45) Date of Patent: Jan. 31, 2006

(54) SYSTEM AND METHOD FOR RESOLVING CONFLICTS DETECTED DURING A SYNCHRONIZATION SESSION

(75) Inventors: James S. L. Chen, Mississauga (CA); Stephen D. Flanagin, Sammamish, WA (US); Mike A. Foster, Redmond, WA (US); Steven Miles, Bothell, WA (US); Brian Moore, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 456 days.

(21) Appl. No.: 09/892,676

(22) Filed: Jun. 27, 2001

(65) Prior Publication Data

US 2003/0055825 A1    Mar. 20, 2003

(51) Int. Cl.
*G06F 17/30* (2006.01)

(52) U.S. Cl. .................. 707/7; 707/10; 707/203; 709/205; 709/206

(58) Field of Classification Search ............. 709/201, 709/236, 248, 203, 206, 205, 3, 7, 8, 10; 700/90

See application file for complete search history.

(56) References Cited

U.S. PATENT DOCUMENTS

| | | | |
|---|---|---|---|
| 5,230,073 A * | 7/1993 | Gausmann et al. ............. 707/3 |
| 5,247,438 A * | 9/1993 | Subas et al. .................. 700/90 |
| 5,727,202 A * | 3/1998 | Kucala ........................ 707/10 |
| 5,758,354 A * | 5/1998 | Huang et al. ................ 707/201 |
| 5,787,262 A * | 7/1998 | Shakib et al. ................ 709/205 |
| 5,878,408 A * | 3/1999 | Van Huben et al. ............ 707/1 |
| 5,926,816 A   | 7/1999 | Bauer et al. .................... 707/8 |
| 5,961,590 A * | 10/1999 | Mendez et al. ............. 709/206 |
| 5,974,238 A * | 10/1999 | Chase, Jr. ................. 709/248 |
| 6,023,708 A * | 2/2000 | Mendez et al. ............. 707/203 |
| 6,052,735 A * | 4/2000 | Ulrich et al. ................ 709/236 |
| 6,088,693 A * | 7/2000 | Van Huben et al. ............ 707/8 |
| 6,094,654 A * | 7/2000 | Van Huben et al. ............ 707/8 |
| 6,125,369 A * | 9/2000 | Wu et al. .................... 707/201 |
| 6,131,096 A * | 10/2000 | Ng et al. ...................... 707/10 |
| 6,212,553 B1 * | 4/2001 | Lee et al. .................... 709/206 |
| 6,295,541 B1 * | 9/2001 | Bodnar et al. .............. 707/203 |
| 6,546,417 B1 * | 4/2003 | Baker ......................... 709/206 |

FOREIGN PATENT DOCUMENTS

EP    0 716 384 A1    6/1996

(Continued)

*Primary Examiner*—Shahid Al Alam
(74) *Attorney, Agent, or Firm*—Merchant & Gould; Ryan T. Grace

(57) ABSTRACT

A system and method is described for resolving a conflict detected while synchronizing a first data object in a first store associated with a mobile device and a second data object in a second store associated with a server. Once the conflict is detected, properties of the first data object are compared with corresponding properties of the second data object. If the properties and the corresponding properties that differ are designated as mergeable properties, the properties and the corresponding properties are merged. Merging the properties involves sending a preferred state associated with each of the properties and the corresponding properties to the mobile device and the server for updating the first data object and second data object, respectively, when an initial state for the properties and the corresponding properties is different than the preferred state. The preferred state is based on a likelihood that vital information would be lost if the preferred state did not replace the initial state of the property or the corresponding property. The merging is performed without user-intervention on the mobile device. In addition, the entire first data object or second data object is not sent to the mobile device to achieve the merge, thereby minimizing the data transfer to the mobile device.

24 Claims, 7 Drawing Sheets

FOREIGN PATENT DOCUMENTS

| | | |
|---|---|---|
| EP | 1 014 629 A2 | 6/2000 |
| EP | 1 024 411 A2 | 8/2000 |
| WO | WO 99/05620 | 2/1999 |
| WO | WO 00/62201 | 10/2000 |

\* cited by examiner

SYSTEM AND METHOD FOR RESOLVING CONFLICTS DETECTED DURING A SYNCHRONIZATION SESSION

TECHNICAL FIELD

The present invention relates to synchronization between mobile devices and fixed devices, and, more specifically, to systems for resolving conflicts detected during a synchronization session between the mobile device and the fixed device.

BACKGROUND OF THE INVENTION

Mobile devices, sometimes referred to as handheld devices, have become quite common today. The users of these mobile devices want to have their mobile device updated with current information quite frequently. The process for updating information involves communicating with a fixed device (i.e., server) and is commonly referred to as a synchronization session. Between synchronization sessions, the mobile device may change information in its mobile store and the fixed device may change information in its server store. If the information that is changed in the mobile store and the server store is associated with the same data object, a conflict is detected during the next synchronization session. In these situations, prior systems that synchronized data objects would provide some type of user interface on the mobile device that would indicate that the conflict existed and that the conflict was with a certain object. In one example, the device user would receive a notification regarding the conflict, when, in fact, the information changed on the object associated with the notification had identical information on both devices (i.e., both devices changed a last name field of a contact object from a maiden name to a married name). In addition to the unhelpful user interface that was provided, prior systems would also keep both versions of the data objects having the conflict on both the mobile device and on the fixed device. As one can imagine, keeping both objects wasted memory on the devices and caused extra work for the user to resolve the otherwise duplicate objects. In addition, sending the other version of the object used bandwidth on the data channel between the devices. Thus, there is a need for an improved method for resolving conflicts detected during a synchronization session that enhances the mobile user's experience.

SUMMARY OF THE INVENTION

Briefly described, the present invention provides a method for resolving a conflict detected while synchronizing a first data object in a first store associated with a mobile device and a second data object in a second store associated with a server. In accordance with the present invention, certain conflicts are automatically resolved without requiring user-intervention on the mobile device and without duplicating data objects on either the mobile device or the server.

In general, once a conflict is detected, properties of the first data object are compared with corresponding properties of the second data object. If the corresponding properties that differ are designated as mergeable properties, the corresponding properties are merged. Merging the properties involves sending a preferred state associated with each of the conflicting properties to the mobile device and the server for updating the first data object and second data object, respectively, when an initial state for the properties and the corresponding properties is different than the preferred state. The preferred state is based on a likelihood that vital information would be lost if the preferred state did not replace the initial state of the property or the corresponding property. For example, if a read property for an email object is marked as read on the mobile device and as unread on the server, the preferred state (unread) is sent to the mobile device to update the email object. Thus, a user is insured that if data is lost, the most conservative approach to data loss results, thereby reducing the danger of the data loss. The merging is performed without user-intervention on the mobile device. In addition, the entire first data object or second data object is not sent to the mobile device to achieve the merge, thereby minimizing the data transfer to the mobile device.

In another aspect of the invention, a system for resolving a conflict detected during a synchronization session is provided. The system includes a first device, a second device, and a server. The first device is associated with a first data store that stores several data objects. The second device is associated with a second data store that stores several corresponding data objects. Each data object in the first data stores is associated with one of the corresponding data objects in the second data store. The server is configured to detect a conflict between the data objects and their corresponding data objects by determining whether a property of the data object is different than a corresponding property of the corresponding data object. If the property and the corresponding property are designates as mergeable properties, the server is configured to merge the property of the data object and the corresponding property. The merging is performed without user-intervention on the first device.

DETAILED DESCRIPTION OF THE PREFERRED EMBODIMENT

The present invention may be implemented in one or more components operating within a distributed or wireless computing network. Those components may include software programs or applications operating on computing systems of various configurations. Two general types of computing systems are being used to implement the embodiments of the invention described here. Those two general types are illustrated in FIG. 1 and FIG. 2 and described below, followed by a detailed discussion of one illustrative implementation of the invention, illustrated in FIGS. 3–7, based on these two types of computer systems.

Illustrative Operating Environment

Figure 1:
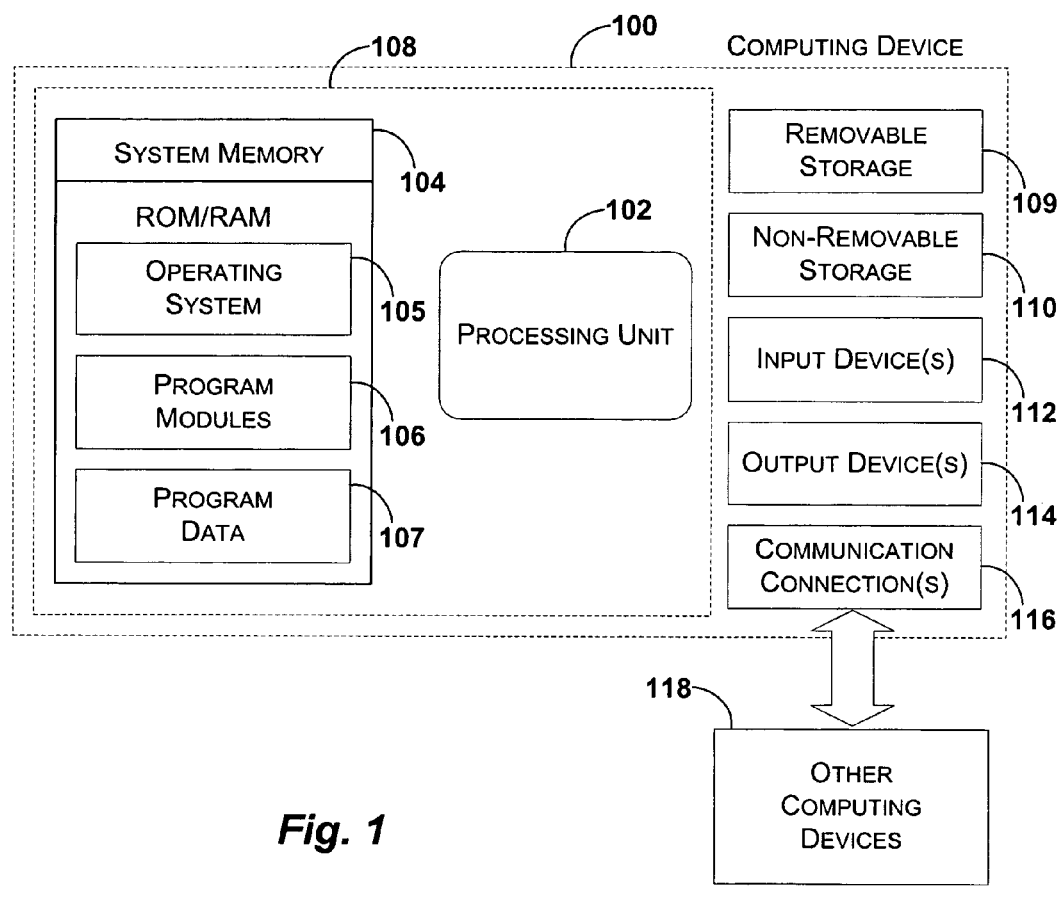
FIG. 1 illustrates an exemplary computing device that may be used in one exemplary embodiment of the present invention.
Figure 2:
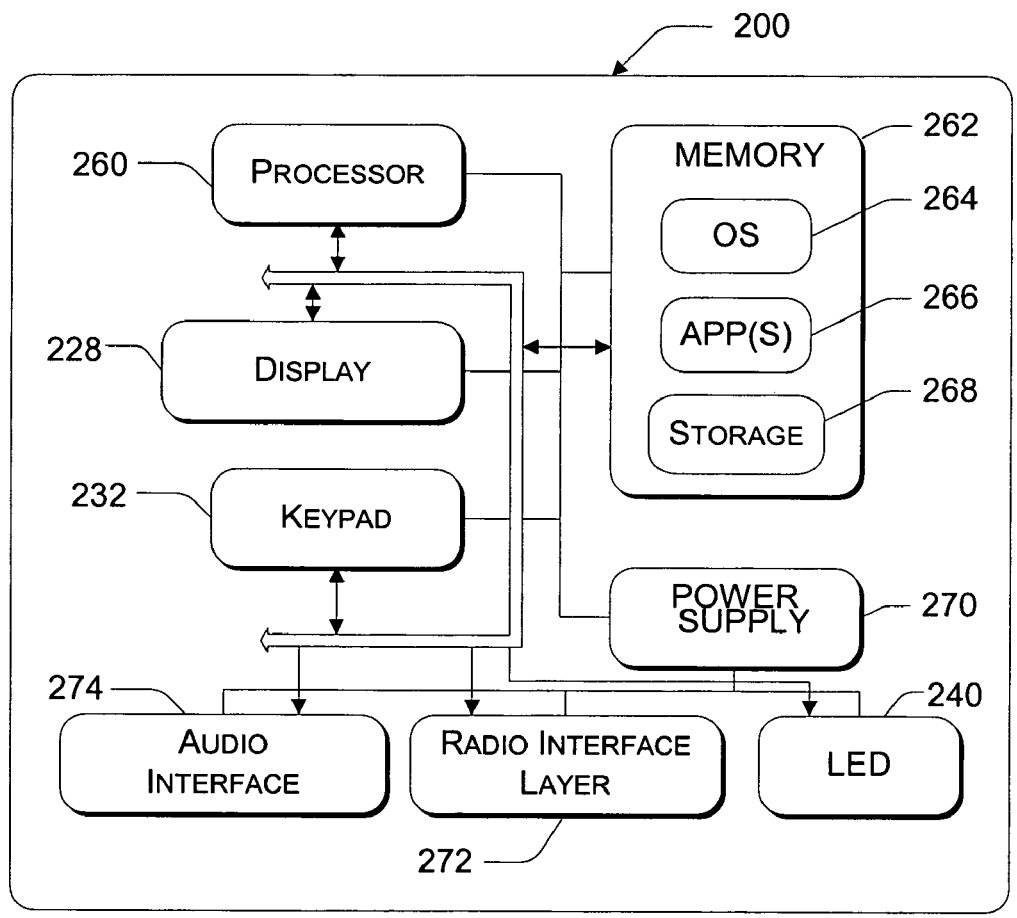
FIG. 2 illustrates an exemplary mobile computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communications connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the WINDOWS CE brand operating system from MICROSOFT CORPORATION located in Redmond, Wash. or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. A synchronization application also resides on the mobile computing device 200 and is programmed to interact with a corresponding synchronization application resident on a host computer to keep the information stored in the storage 268 synchronized with corresponding information stored at the host computer.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Conflict Resolution System

Figure 3:
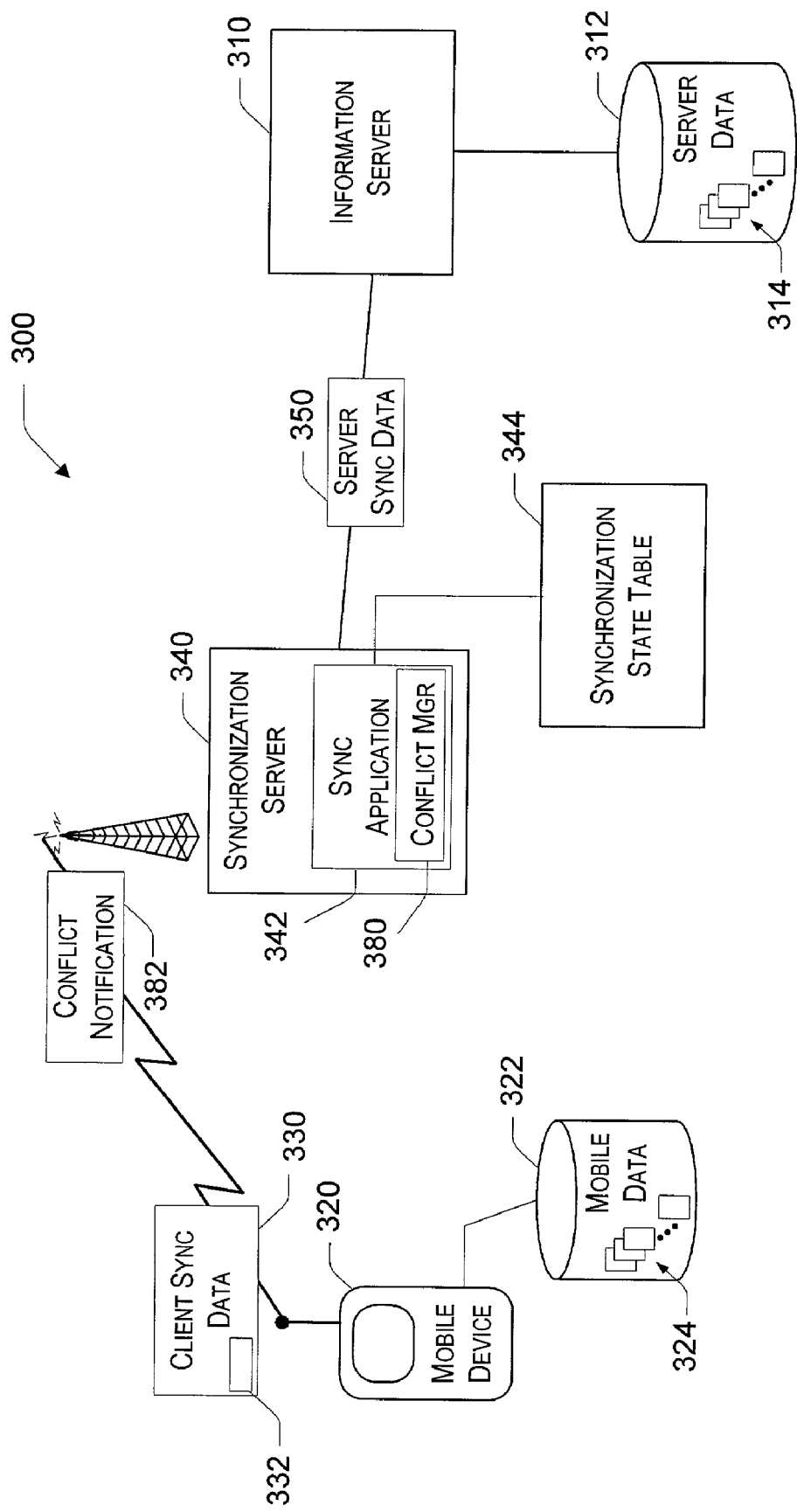
FIG. 3 is a functional block diagram of one exemplary conflict resolution system as implemented using the computer device shown in FIG. 1 and the mobile computing device shown in FIG. 2.

FIG. 3 is a functional block diagram generally illustrating one embodiment for a synchronization system with conflict resolution 300 that resolves conflicts between data objects detected during a synchronization session between a fixed computing device, such as an information server 310 and a mobile device 320, in accordance with the present invention. In this implementation, the information server 310 is a computing device such as the one described above in conjunction with FIG. 1, and the mobile device 320 (i.e., client) is a mobile computing device such as the one described above in conjunction with FIG. 2. A synchronization application 342 performs the synchronization process between the information server 310 and the mobile device 320. The synchronization application 342 includes a conflict manager 380 for detecting and resolving the conflicts during the synchronization sessions. In the embodiment illustrated, the synchronization application 342 resides on a synchronization server 340, which is a computing device as described above in conjunction with FIG. 1. Alternatively, the synchronization application 342 may reside in any acceptable location, such as directly on the information server 340 or on the mobile device 320. The synchronization server 340 is shown coupled to the information server 310 over a local or wide area network in the conventional manner. In another embodiment, the synchronization application 342 may reside on information server 310 without departing from the scope of the present invention.

Figure 4:
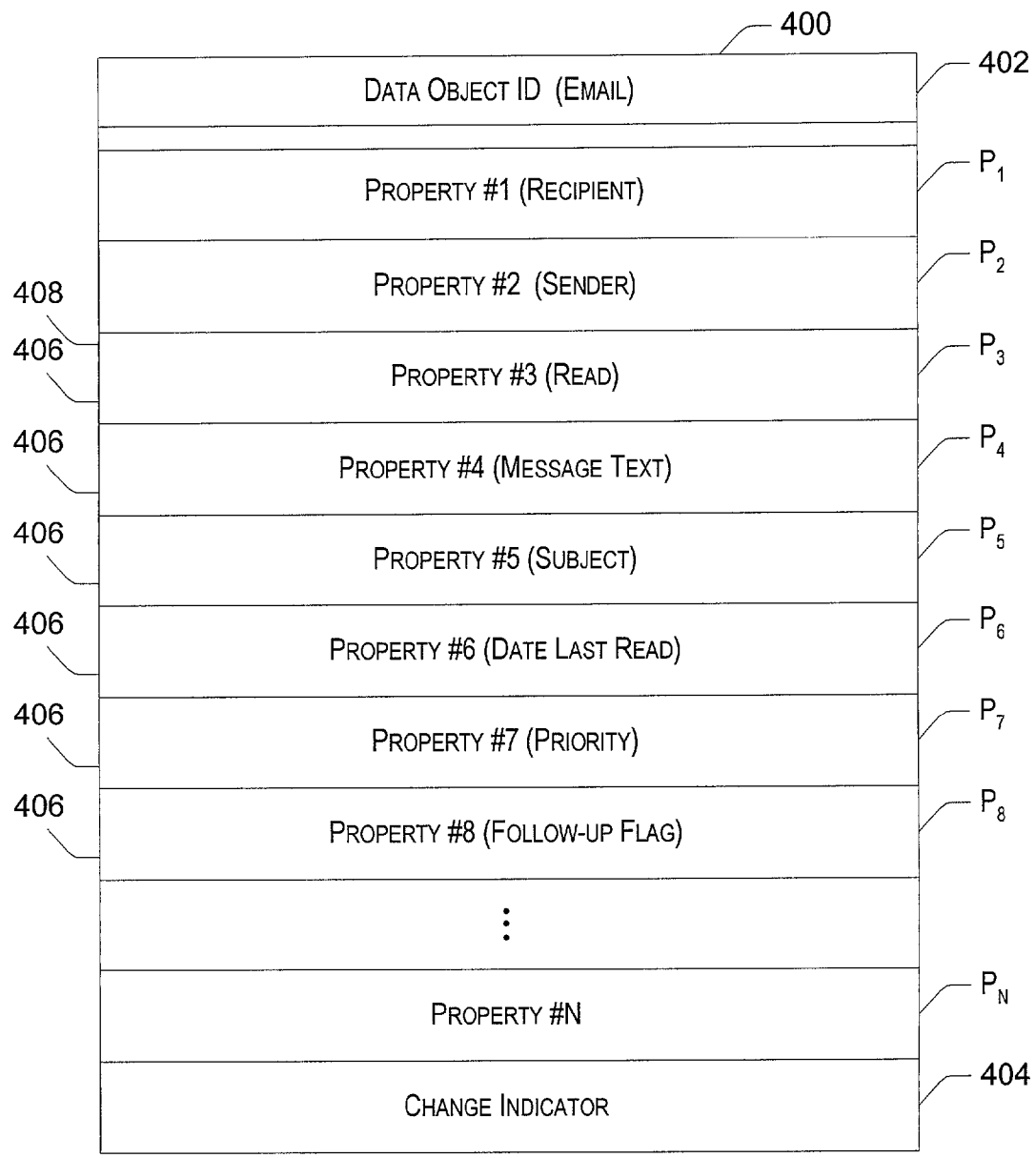
FIG. 4 is a graphical representation of one embodiment of the salient portions of a sample data object.

The mobile device 320 maintains mobile data 322 (i.e., a mobile data store) locally in its non-volatile storage 268 (shown in FIG. 2). Information server 310 maintains server data 312 (i.e., a server data store) on its removable storage 109 or non-removable storage 110 (shown in FIG. 1). As mentioned earlier, the mobile data 322 and the server data 312 may include e-mail or other messages used by an e-mail application, contact information used by a PIM, appointment information used by a scheduling program, and the like. Typically, each type of data in the mobile data 322 or server data 312 is referred to as a "collection" (e.g., e-mail and contacts are two separate collections). Each collection includes a plurality of data objects. For example, the server data 312 includes a plurality of server data objects 314 and the mobile data 322 includes a plurality of mobile data objects 324. A representative illustration of the salient portions of a sample data object is illustrated in FIG. 4 and described below.

The mobile device 320 may change the mobile data 322 on the mobile device 320 at anytime. Once the mobile data 322 is changed, server data 312 accessible by the information server 310 will not have identical information. Similarly, the information server 310 may change the server data 312, such as through any number of networked personal computers (not shown) connected to the information server 310. Again, once the server data 312 is changed, the mobile data 322 and server data 312 are no longer identical (i.e., data is not synchronized and the changes on both sides create a conflict). In order for the mobile data 322 and the server data 312 to become identical (i.e., synchronized), typically, the mobile device 320 initiates a synchronization session. During the synchronization session, the synchronization application 342 attempts to update the server data objects 314 and the mobile data objects 324 to have identical information. In other words, after a successfully synchronization session, the server data objects 314 will have a corresponding mobile data object 324 with the same information.

Briefly, during the synchronization session of one embodiment of the present invention, client synchronization data 330 is transmitted between the mobile device 320 and the synchronization application 342, and server synchronization data 350 is transmitted between the synchronization application 342 and the information server 310. The client synchronization data 330 specifies changes to the mobile data 322 since the last successful synchronization session and specifies changes to the server data 312 that the mobile device 320 should update on its mobile data 322. The server synchronization data 350 specifies changes that the information server 310 should make to its server data 312 and specifies changes to the server data 312 that the mobile device 320 should make to its mobile data 322. The synchronization application 342 saves information regarding the synchronization session in a synchronization state table 344.

During the synchronization sessions, the conflict manager 380, briefly described here and illustrated in FIGS. 5–7 and described in detail below, determines which of the changes to the mobile data 322 and the server data 312 involve a conflict. After determining there is a conflict, the conflict manager 380 attempts to resolve the conflict without sending a conflict notification 382 to the mobile device 320. In one embodiment, the client synchronization data 330 includes a parameter 332, described in more detail with reference to FIGS. 6 and 7, that specifies how automatic conflict resolution should be handled. However, when certain types of conflicts occur, a conflict notification 382 is sent to the mobile device 320. A sample XML message is shown below that represents a general format for one embodiment of the conflict notification 382 sent to the mobile device 320.

```
<SYNC>
    ...
    <COLLECTION>
        <COLLECTIONTYPE>E-MAIL</>
        <RESPONSES>
            <RESPONSE>
                <OBJECT ID>123</>
                <COMMAND>CHANGE</>
                <STATUS>READ FLAG MODIFIED</>
                </>
        </>
        ...
    </>
```

As shown, the sample conflict notification includes the object id (shown as "123") that has changed and a status (shown as "Read Flag Modified") describing the type of change that occurred. In general, the conflict notification 382 provides sufficient information to the mobile device 320 such that the mobile device 320 may provide a suitable user interface (not shown) to the user regarding the conflict. The user interface may be implemented in any manner and will depend on how the application 266 (shown in FIG. 2) responsible for displaying the conflict information chooses to relay the conflict information to the user of the mobile device 320. Because the specific user interface chosen is not pertinent to understand the present invention, the present discussion does not further describe the user interface on the mobile device 320. The sample conflict notification shown above only includes the property that caused the conflict than the entire object. This embodiment increases the efficiency of the conflict resolution process when using wireless technology because less data is sent.

As will be described in greater detail below, the conflict manager 380 in accordance with the present invention, automatically resolves certain conflicts and provides sufficient conflict notification 382 to the mobile device 320 for a user to select how the conflict should be resolved using the user interface on the mobile device 320 when the conflict can not be automatically resolved. Thus, the present invention provides an efficient method for resolving conflicts in data objects during a synchronization session.

FIG. 4 is a graphical representation of one embodiment of the salient portions of a sample data object 400 that may be used as a server data object 314 or a mobile data object 324 in conjunction with present invention. The sample data object 400 includes an object id (OID) 402, a plurality of properties $P_{1-N}$, and a change indicator 404. The object id 402 may be a server ID (SID) if the object ID (OID) is stored on the server 310 or a device ID (DID) if the object ID is stored on the device 320. As one skilled in the art will appreciate, after synchronization is complete, each SID typically has a corresponding DID on the mobile device to which it is mapped. The properties $P_{1-N}$ store information associated with the data object based on the type of data object.

A representative data object is illustrated in FIG. 4 and represents an email message object. The illustrative properties for the email message object may include a recipient field $P_1$, a sender field $P_2$, a read flag field $P_3$, a message text field $P_4$, a subject field $P_5$, a data last read field $P_6$, a priority field $P_7$, a follow-up flag field $P_8$ and any other information regarding the email message object. The change indicator 404 indicates when any the properties $P_{1-N}$ of the data object 400 have changed. For example, if a user reads the email message, property #4 (read property) is set to indicate read and the change indicator 404 is marked indicating that the data object 400 has changed in some way. When the change indicator 404 is so marked, the data object 400 is sometimes referred to as "dirty". The data object 400 is considered "dirty" even if the user reads the email message and then sets the email message as unread (the value of property #4 would, in essence, remain the same).

In accordance with the present invention, certain properties are also designated as syncable properties 406. Syncable properties 406 are properties within the data object 400 that may be changed. Typically, properties that cannot be changed are not designated as syncable properties (e.g., the recipient field $P_1$ and the sender field $P_2$). However, these non-changeable properties may be designated as syncable properties without departing from the scope of the present invention. In addition, in accordance with the present invention, some of the designated syncable properties 406 are further designated as mergeable properties 408 (e.g., the read property $P_3$). As will be described in detail below in reference to FIGS. 5–7, the conflict manager uses the change indicator 404, the syncable properties 406 and the mergeable properties 408 when determining a "true" conflict and resolving the "true" conflict, in accordance with the present invention. By determining "true" conflicts in the manner described in the present invention, users do not receive unhelpful conflict messages and do not need to intervene each time both the mobile data object and the corresponding server data change.

Figure 5:
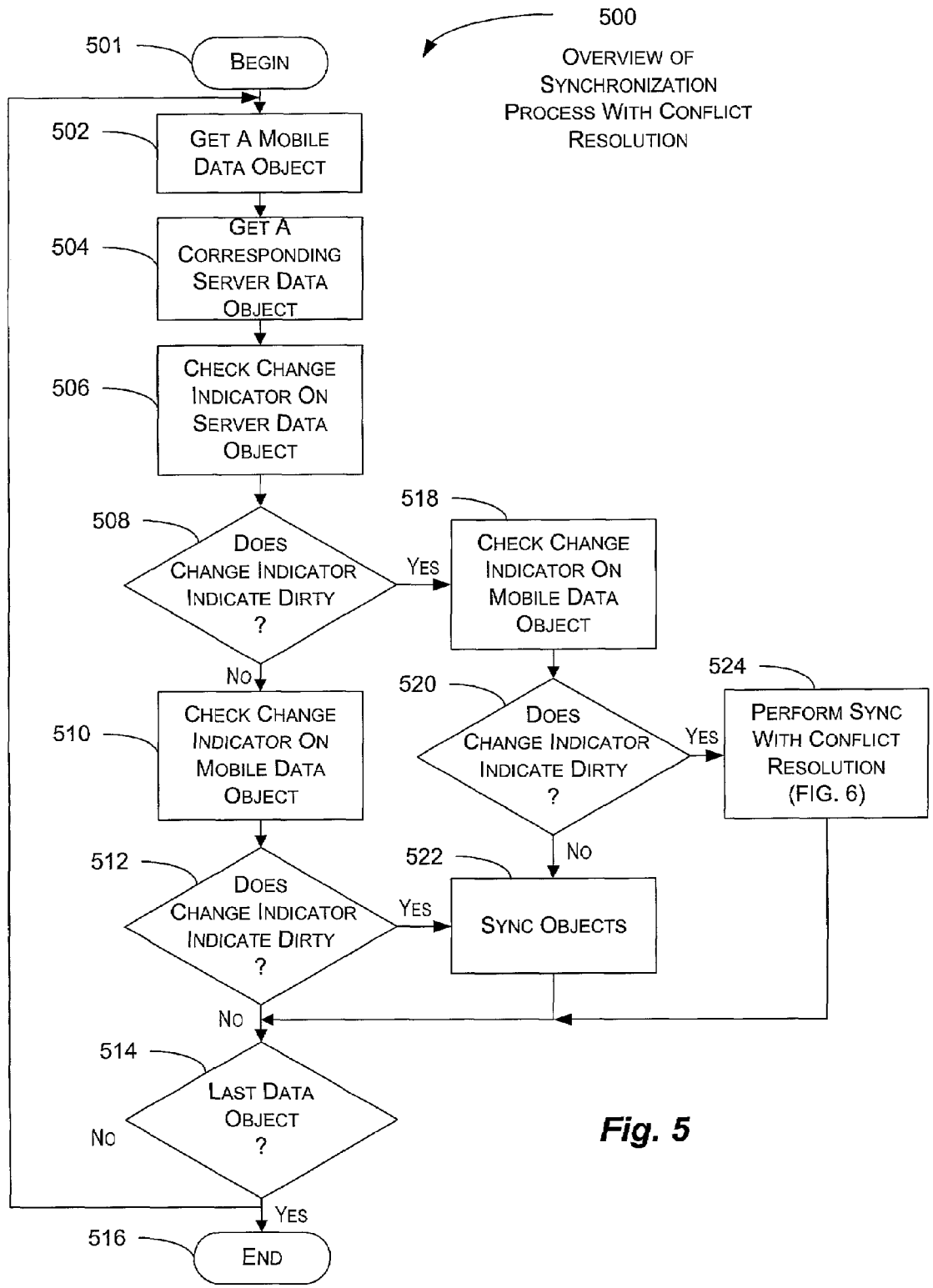
FIG. 5 is a logical flow diagram generally illustrating an overview of a synchronization process with conflict resolution.

FIG. 5 is a logical flow diagram generally illustrating an overview of a synchronization process having a conflict resolution process for resolving conflicts detected during a synchronization session. Briefly, the overview of the synchronization process shown in FIG. 5 detects whether a potential conflict, in accordance with the present invention, may exist and the manner in which the potential conflict is resolved during the synchronization process. The synchronization process with conflict resolution 500 begins at block 501, where a synchronization session has been initiated and both the mobile device 320 and the information server 320 have sent client synchronization data 330 and server synchronization data 350 to the synchronization application 342, respectively. The synchronization application 342 has passed the client synchronization data 330 and server synchronization data 350 to the conflict manager 380 for conflict processing. Processing continues at blocks 502 and 504.

At blocks 502 and 504, the conflict manager 380 gets one of the mobile data objects 324 (block 502) and a corresponding server data object 314 (504).

At block 506, the conflict manager 380 checks the change indicator 404 associated with the corresponding server data object 314 to determine whether any changes have been made to the server data object 314.

At decision block 508, if the change indicator 404 associated with server data object 314 indicates that the server data object 314 is not "dirty" (i.e., no changes were made to any properties associated with the server data object 314), the process continues at block 510.

At block 510, the conflict manager 380 checks the change indicator 404 associated with the mobile data object 324 to determine whether any changes have been made to the mobile data object 324.

At decision block 512, if the change indicator 404 associated with the mobile data object 324 indicates that the mobile data object 324 is not "dirty" (i.e., no changes were made to any properties associated with the mobile data object 324), the mobile data object 324 and the server data object 314 are not synchronized because neither data object had updates. In one embodiment, either the mobile data object 324 or the server data object 314 will be "dirty". This reduces the amount of data transmitted in the synchronization data because it insures at least one of the data objects has changed. If the mobile data object 324 is not "dirty" at decision block 512, processing continues at decision block 514.

At decision block 514, the conflict manager 380 determines whether there are any more mobile data objects 324 and corresponding server data objects 314. If some data objects 314, 324 still remain to be processed, the process loops back to block 502 and proceeds as described above. However, once all the data objects 324 314 have been processed, the conflict resolution processing within the synchronization process is complete and the process ends at end block 516.

Now, returning to decision block 508, if the conflict manager 380 determines that the server data object is "dirty", processing continues at block 518 and then to decision block 520. At block 518, the conflict manager 380 checks the change indicator 404 associated with the mobile data object 324 to determine whether any changes have been made to the mobile data object 324. At decision block 520, if the change indicator 404 associated with the mobile data object 324 indicates that the mobile data object 324 is not "dirty" (i.e., no changes were made to any properties associated with the mobile data object 324). If the mobile data object 324 is not "dirty", this indicates that only one of the data objects is "dirty". Thus, the data objects 314 324 may be synchronized using any well-known synchronization technique without performing the conflict resolution process of the present invention. Typically, the synchronization provided in block 522 attempts to update both data objects 314 324 to have identical information. Block 522 is also entered after a determination is made at decision block 512 that only the mobile data object 324 is "dirty". Again, because only one of the data objects is "dirty", synchronization is provided without performing the conflict resolution process of the present invention.

However, if both data objects 314 324 are "dirty", as determined at decision blocks 508 and 520, processing continues to block 524. Briefly, at block 524, the conflict manager determines the extent of the conflict between the mobile data object 324 and the server data object 314 and attempts to resolve the conflict with as little user intervention as possible. A detailed description of the conflict resolution process is illustrated in FIG. 6 and described below. Processing then continues to decision block 514 and proceeds as described above.

Figure 6:
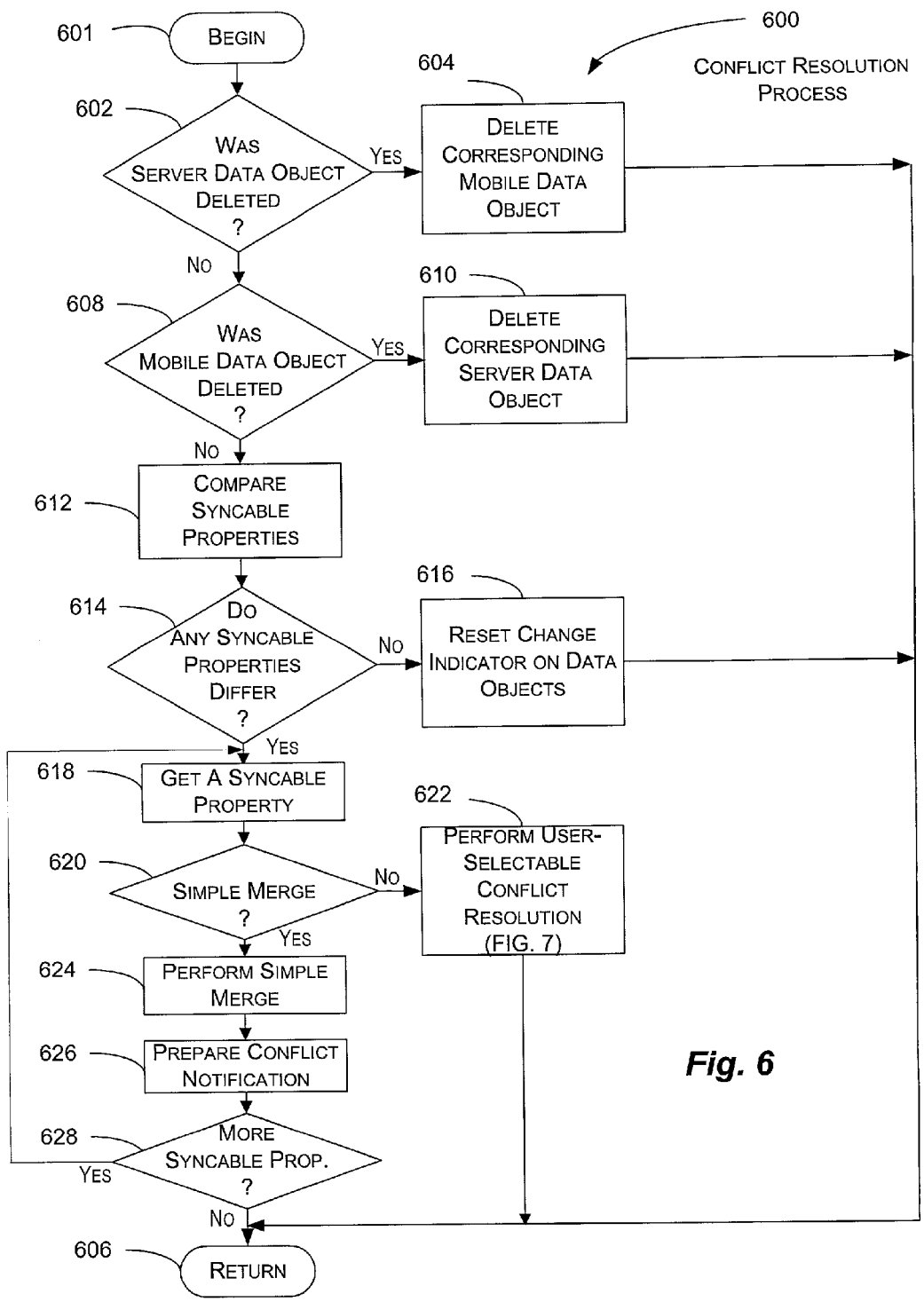
FIG. 6 is a logical flow diagram illustrating a conflict resolution process suitable for use in FIG. 5.

FIG. 6 is a logical flow diagram illustrating one embodiment of a conflict resolution process 600 suitable for use in FIG. 5. The conflict resolution process 600 begins at block 601, after the conflict manager 380 has determined that there is a conflict between a mobile data object 324 and a corresponding server data object 314. Processing continues at decision block 602.

At decision block 602, a determination is made whether the change indicator 404 indicates that the server data object 324 was "dirty" because the server data object 314 has been deleted. If the server data object 314 has been deleted, processing continues to block 604. At block 604, the conflict manager instructs the synchronization application 342 (FIG. 3) to delete the corresponding mobile data object 324. The synchronization application 342 may then include the appropriate information in the client synchronization data 330 sent to the mobile device 320 at some later time. The synchronization application may include the information in the current synchronization session or in a later synchronization session. Processing continues to return block 606 and back to FIG. 5.

Returning back to decision block 602, if the server data object 314 has not been deleted, processing continues to decision block 608. At decision block 608, a determination is made whether the change indicator 404 for the mobile data object 324 indicated that the mobile data object 324 was "dirty" because the mobile data object 324 has been deleted. If the mobile data object 324 has not been deleted, processing continues at block 610. At block 610, the conflict manager instructs the synchronization application 342 (FIG. 3) to delete the corresponding server data object 314 during one of the synchronization sessions. Processing continues to return block 606 and back to FIG. 6.

Returning back to decision block 608, if the mobile data object 324 has not been deleted, processing continues at block 612. At block 612, the properties of the mobile data object 324 and the server data object 314 that were designated as syncable properties are compared. As mentioned earlier, by specifying only certain of the properties as syncable properties 406, the present invention decreases the number of conflicts that are reported compared to prior conflict resolution methods. In addition, the conflict resolution process, in accordance with the present invention, is able to automatically resolve these "true" conflicts based on the syncable properties without user intervention in certain situations. Processing continues to decision block 614.

At decision block 614, a determination is made whether any of the syncable properties indeed differ. If none of the syncable properties differ, processing continues to block 616, where the change indicator 404 for both the mobile data object 324 and the server data object 314 are reset to indicate that the corresponding object is not "dirty." Thus, in accordance with the present invention, the user of the mobile device 320 does not receive an unintelligible conflict message due to changes in the data objects 314 324 that do not warrant user concern. For example, if only the "Read" property has been changed from unread to read on both objects, even though both messages are "dirty," the information is the same and the user need not be informed. Processing continues to return block 606 and back to FIG. 6.

Returning back to decision block 614, if it is determined that syncable properties differ, processing continues to decision block 618, where the syncable property is retrieved.

At block 620, a determination is made whether all the syncable properties that differ can be resolved using the simple merge process. This determination is based on whether the syncable properties that differ are also designated as mergeable properties 408 (FIG. 4) in the data objects. If any of the syncable properties that differ are designated as a mergeable property, the process continues at block 624.

At block 624, a simple merge process is performed. In accordance with the present invention, each property designated as a mergeable property has an associated predetermined preferred state for the property. In one embodiment, the preferred state is related to the likelihood that vital information would be lost if the property of the data object was not changed to the preferred state. In another embodiment, the user on the mobile device may specify the preferred state for the property designated as a mergeable property. During the simple merge process the preferred state for the property is pushed to the data object with the property in a state different than the preferred state. A beneficial effect on resolving the conflict using the simple merge process is that the user is not inconvenienced by an unintelligible conflict message that requires user-intervention and that the user does not lose vital information. Below are two tables summarizing the outcome of processing from block 624. Table 1 summarizes the simple merge process (block 624) for conflicting email objects in which "UNREAD" is the preferred state. Table 2 summarizes the simple merge process (block 624) for conflicting appointment objects in which "POSTPONE" or "POSTPONE to earliest time" is the preferred state.

TABLE 1

| Starting State (Synched) | | User Action (Disconnected) | | State After Change (Disconnected) | | Simple Merge Changes (N/C = No Change) | |
| --- | --- | --- | --- | --- | --- | --- | --- |
| Server | Device | Server | Device | Server | Device | Server | Device |
| READ | READ | Marks Mail As UNREAD | Marks Mail As UNREAD, then READs mail | UNREAD | READ | UNREAD, N/C | Change to UNREAD; Send conflict status to device |

TABLE 1-continued

| Starting State (Synched) | | User Action (Disconnected) | | State After Change (Disconnected) | | Simple Merge Changes (N/C = No Change) | |
|---|---|---|---|---|---|---|---|
| Server | Device | Server | Device | Server | Device | Server | Device |
| READ | READ | Marks Mail As UNREAD, then READs it | Marks Mail As UNREAD, then READs it | READ | READ | READ, N/C | READ, N/C |
| READ | READ | Marks Mail As UNREAD, then READS it | Marks Mail As UNREAD | READ | UNREAD | Change to UNREAD | UNREAD, N/C |
| UNREAD | UNREAD | READs mail then Marks As UNREAD | READs Mail | UNREAD | READ | UNREAD, N/C | Change to UNREAD; Send conflict status to device |
| UNREAD | UNREAD | READs mail, then Marks As UNREAD | READs mail, then Marks As UNREAD | UNREAD | UNREAD | UNREAD, N/C | UNREAD, N/C |
| UNREAD | UNREAD | READs Mail | READs mail, then Marks As UNREAD | READ | UNREAD | Change to UNREAD | UNREAD, N/C |

TABLE 2

| Starting State (Synched) | | User Action (Disconnected) | | Simple Merge Action Performed (N/C = No Change) | |
|---|---|---|---|---|---|
| Server | Device | Server | Device | Server | Device |
| Reminder ON | Reminder ON | Dismiss | Dismiss | N/C | N/C |
| Reminder ON | Reminder ON | Dismiss | Postpone for X minutes | Change to Postpone for X Minutes | N/C |
| Reminder ON | Reminder ON | Postpone for X minutes | Dismiss | N/C | Change to Postpone for X Minutes; send conflict property to device |
| Reminder ON | Reminder ON | Postpone until X:00. | Postpone until X:00. | N/C | N/C |
| Reminder ON | Reminder ON | Postpone until X:00. | Postpone until Y:00. | Sync the change that reminds the user the earliest. | Sync the change that reminds the user the earliest; send conflict property to device. |

After the simple merge process is completed, processing continues at block 626.

At block 626, a conflict notification for the above syncable property is prepared. As described earlier, the conflict notification provides sufficient information that the mobile device 320 may display a user interface with the information if desired. In one embodiment, only the property causing the conflict is sent to the mobile device rather than the entire data object. Processing continues to return block 606 and back to FIG. 5.

Returning to decision block 620, when all the syncable properties that differ cannot be resolved using a simple merge process, processing continue to block 622. At block 622, a user-selectable conflict resolution process is performed based on a conflict resolution method selected by the user of the mobile device 320. Briefly, in one embodiment, a user may request one of three conflict resolution methods: client wins, server wins, or keep both. The user of the mobile device 320 selects the method using one of the input devices 112 available on the mobile device, such as a keypad. The appropriate program module 106 will then include the parameter 322 that specifies the selected method within the synchronization data 330 sent to the synchronization application 342. The synchronization application 342 will provide the parameter 332 to the conflict manager 380. The technique used to specify the selected method for conflict resolution and pass the information to the conflict manager 380 may be achieved using various techniques known with the art and which do not involve undue experimentation. The user-selectable conflict resolution is illustrated in FIG. 7 and described below in detail. Processing continues to return block 606 and back to FIG. 5.

Figure 7:
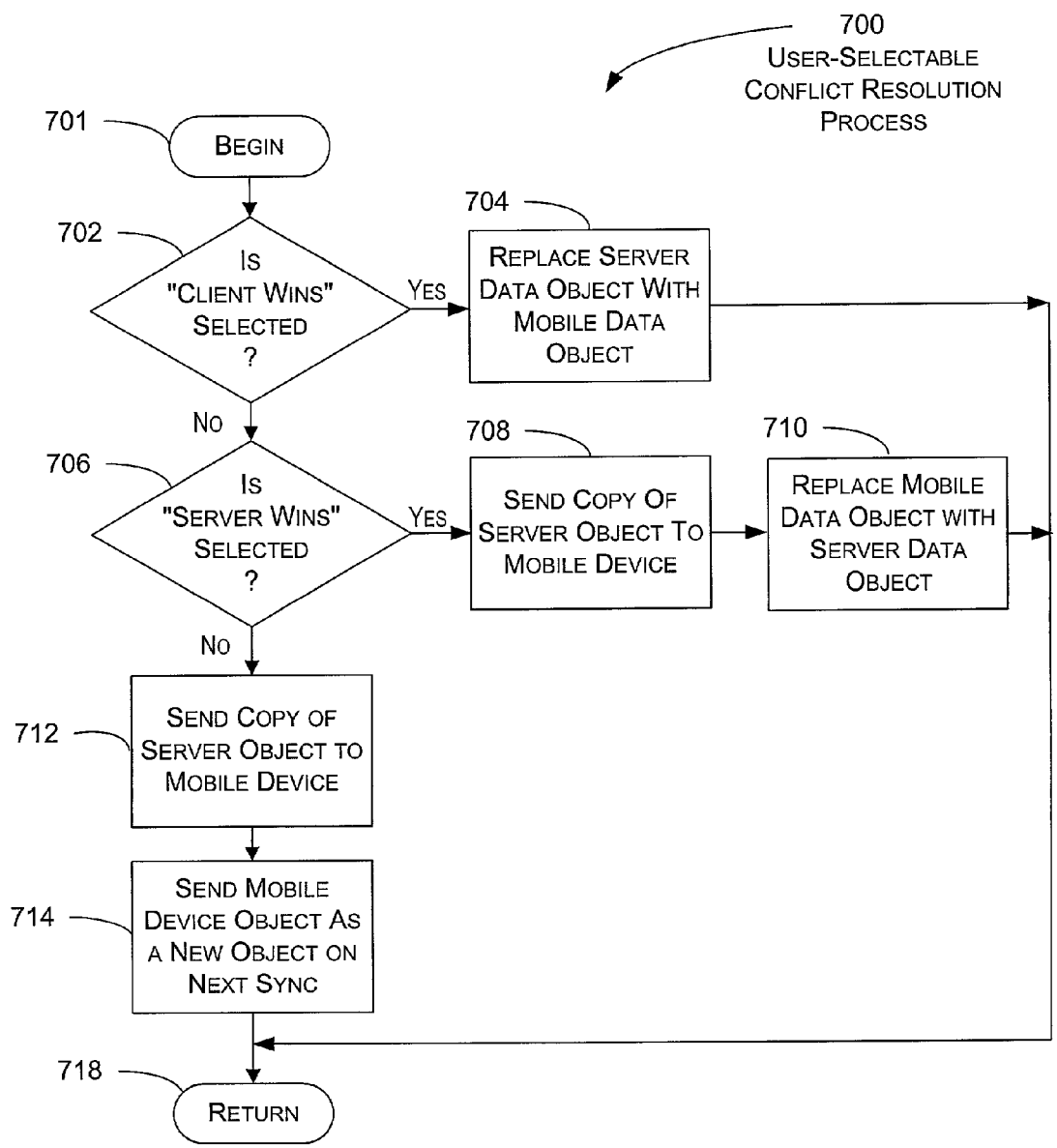
FIG. 7 is a logical flow diagram illustrating a user-selectable conflict process suitable for use in FIG. 6, in accordance with one embodiment of the present invention.

FIG. 7 is a logical flow diagram illustrating one embodiment of a user-selectable conflict process 700 suitable for use in FIG. 6. The user-selectable conflict resolution process 700 begins at block 701, after there has been a determination that a simple merge process is not available for resolving the conflict between the mobile data object 324 and the corresponding server data object 314. Processing continues at decision block 702.

At block 702, a determination is made whether the user of the mobile device 320 chose the "client wins" method. If the "client wins" method was chosen, processing continues at block 704. At block 704, the server data object 314 is replaced with the mobile data object 324. One skilled in the art will appreciate that the replacement of the data object may occur immediately or at some later time during the synchronization session or a later synchronization session. Processing continues to return block 718 and back to FIG. 6.

Returning to block 702, if the user did not chose the "client wins" method, processing continues to decision block 706. At decision block 706, a determination is made whether the user selected the "server wins" method. If the "server wins" method is chosen, processing continues to blocks 708 and 710. At block 708, a copy of the server data object 314 is sent to the mobile device 320. At block 710, the mobile data object 324 is replaced with the server data object 314. Again, the actual replacement of the mobile data object 324 may occur at anytime during the synchronization session or may occur during a later synchronization session. Processing continues to return block 718 and back to FIG. 6.

Returning to block 706, if the user did not chose the "server wins" method, the default method "keep both" is performed. Processing continues at blocks 712–714. At block 712, a copy of the server data object 314 is sent to the mobile device 320. At block 714, the prior mobile data object 324 is sent to the server as a new data object during the next synchronization session. Processing continues to return block 718 and back to FIG. 6.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for resolving a conflict detected while synchronizing a first data file in a first store associated with a mobile device and a second data file in a second store associated with a server, comprising:

designating at least one property of the first data file as a mergeable property and at least one corresponding property of the second data file as a corresponding mergeable property;

determining when the conflict detected comprises a difference between the at least one mergeable property of the first data file and the at least one corresponding mergeable property of the second data file; and when the conflict detected does not comprise a difference between the at least one mergeable property of the first data file and the at least one corresponding mergeable property of the second data file, indicating that the at least one mergeable property of the first data file and that at least one corresponding mergeable property of the second data file are not dirty, wherein synchronization is not performed; and when the conflict detected comprises a difference between the at least one mergeable property of the first data file and the at least one corresponding mergeable property of the second data file, merging the at least one mergeable property of the first data file and the at least one corresponding mergeable property of the second data file to form a single identical data file in each of the first and second stores.

2. The computer-implemented method of claim 1, wherein merging the first data file and the second data file comprises determining a preferred state for each of the at least one mergeable property and corresponding mergeable property that differ and storing the preferred state in the mergeable property and corresponding mergeable property if an initial state of the mergeable property and the corresponding mergeable property is different than the preferred state.

3. The computer-implemented method of claim 2, wherein the preferred state is related to a likelihood that vital information would be lost if the preferred state did not replace the initial state when different.

4. The computer-implemented method of claim 2, wherein the first data file and the second data file comprise an email file, the mergeable property and corresponding mergeable property comprises a read indicator, and the preferred state comprises an unread state.

5. The computer-implemented method of claim 1, wherein merging is performed without user-intervention on the mobile device.

6. The computer-implemented method of claim 1, further comprising sending a notification to the mobile device if merging of the first data file and the second data file was performed.

7. The computer-implemented method of claim 6, wherein the notification includes an identifier associated with the first data file, a property name associated with the mergeable property in conflict, and a status describing the conflict.

8. The computer-implemented method of claim 1, wherein the first data file and the second data file comprise an email file and the at least one mergeable property and corresponding mergeable property comprises a read indicator.

9. The computer-implemented method of claim 1, wherein the first data file and the second data file comprise an appointment file and the at least one mergeable property and corresponding mergeable property comprises a reminder and a reminder time.

10. The computer-implemented method of claim 9, wherein the conflict is resolved by merging a reminder with an earlier reminder time of the conflicting properties as the value for both properties.

11. The computer-implemented method of claim 1, further comprising determining if values associated with the at least one mergeable property of the first data file and the at least one corresponding mergeable property of the second data file are the same, and if so, dismissing the conflict.

12. A computer-readable medium having computer-executable instructions for synchronizing a first data file associated with a mobile device and a second data file associated with a server, the instructions comprising:

receiving a request for a synchronization event that synchronizes the first data file with the second data file;

during the synchronization event, comparing the first data file to the second data file to determine whether one of the first data file and second data file is dirty;

when the first data file and the second data file are not dirty, dismissing the synchronization event;

when the first data file and the second data file are dirty, performing a conflict resolution, wherein the conflict resolution includes:
    indicating that the first data file and the second data file are not dirty when the first data file and the second data file are not different; and
    automatically merging a mergeable property of the first data file with a corresponding mergeable property of the second data file, when the first data file and the second data file are different.

13. The computer-readable medium of claim 12, wherein merging the mergeable property of the first data file with the corresponding mergeable property of the second data file comprises:
    determining a preferred state for the mergeable property and the corresponding mergeable property;
    sending the preferred state to the mobile device if an initial state of the mergeable property of the first data file is different than the preferred state; and
    sending the preferred state to the server if the initial state of the corresponding mergeable property of the second data file is different than the preferred state.

14. The computer-readable medium of claim 13, wherein the preferred state is based on a likelihood that vital information would be lost if the preferred state did not replace the initial state when different.

15. The computer-readable medium of claim 12, wherein merging is performed without user-intervention on the mobile device.

16. The computer-readable medium of claim 12, wherein the first data file comprises a set of properties and merging includes sending a sub-set of the set of properties to the mobile device if an initial state of the mergeable property that differs from the corresponding mergeable property is different than a preferred state.

17. The computer-readable medium of claim 16, wherein the sub-set includes the mergeable property that differs from the corresponding mergeable property.

18. The computer-readable medium of claim 16, wherein the preferred state is based on a likelihood that vital information would be lost if the preferred state did not replace the initial state when different.

19. A system for resolving a conflict detected during a synchronization session, comprising:
    a first device associated with a first data store, the first store storing a plurality of data files;
    a second device associated with a second data store, the second data store storing a plurality of corresponding data files, each corresponding data file being associated with one of the data files stored in the first store; and
    a server configured to:
        determining whether at least one of the plurality of data files is dirty;
        determining whether at least one of the plurality of corresponding data files is dirty;
        when the at least one of the plurality of data files and the at least one of the plurality of corresponding data files are not dirty, not performing the synchronization session;
    when the at least one of the plurality of data files and the at least one of the corresponding data files are dirty, performing a conflict resolution, wherein the conflict resolution includes:
        removing a dirty indication when the at least one of the plurality of data files and the at least one of the plurality of corresponding data files are not different; and
        merging the at least one of the plurality of data files and the at least one of the plurality of corresponding data files when the at least one of the plurality of data files and the at least one of the plurality of corresponding data files are different and designated as mergeable properties.

20. The system of claim 19, wherein the server is configured to merge the mergeable property of the data file and the corresponding mergeable property if different by sending a preferred state for the mergeable property to the mobile device if an initial state for the mergeable property is different than the preferred state and by sending the preferred state for the corresponding mergeable property to the server if the initial state for the corresponding mergeable property is different than the preferred state.

21. The system of claim 20, wherein the preferred state is based on a likelihood that vital information would be loss if the preferred state did not replace the initial state when different.

22. The system of claim 21, wherein the data file and the corresponding data file comprise an email file, the mergeable property and the corresponding mergeable property comprise a read indicator, and the preferred state comprises an unread state.

23. The system of claim 19, wherein the server is configured to merge the mergeable property of the data file and the corresponding mergeable property without user-intervention on the first device.

24. A computer-implemented method for synchronizing a first data file and a second data file, comprising:
    determining whether at least one corresponding property of a first data file is dirty;
    determining whether at least one corresponding property of a second data file is dirty;
    when the at least one corresponding property of the first data file and the at least one corresponding property of the second data file are not dirty, not synchronizing the at least one corresponding property of the first data file and the at least one corresponding file of the second data file;
    when the at least one corresponding property of the first data file is dirty and the at least one corresponding property of the second data file is not dirty, synchronizing the at least one corresponding property of the first data file and the at least one corresponding file of the second data file to include identical information;
    when the at least one corresponding property of the first data file and the at least one corresponding property of the second data file are dirty, performing a conflict resolution, wherein the conflict resolution includes:
        deleting the at least one corresponding property of the first data file, when the at least one corresponding property of the second data file is deleted;
        indicating that the at least one corresponding property of the first data file and the at least one corresponding property of the second data file are not dirty when the at least one corresponding property of the first data file and the at least one corresponding property of the second data file are not different; and
        merging the at least one corresponding property of the first data file and the at least one corresponding property of the second data file when the at least one corresponding property of the first data file and the at least one corresponding property of the second data file are different and designated as mergeable properties.

* * * * *